United States Patent [19]
Betts et al.

[11] Patent Number: 5,682,378
[45] Date of Patent: Oct. 28, 1997

[54] ECHO CANCELLATION FOR MODEMS

[75] Inventors: William Lewis Betts, St. Petersburg; Edward Sigmund Zuranski, Largo, both of Fla.

[73] Assignee: Paradyne Corporation, Largo, Fla.

[21] Appl. No.: 557,634

[22] Filed: Nov. 14, 1995

[51] Int. Cl.[6] ................................................. H04B 3/23
[52] U.S. Cl. .......................... 370/286; 379/410; 370/290; 375/222
[58] Field of Search .......................... 379/410, 411, 379/406; 370/32.1, 286, 290, 291; 375/222

[56] References Cited

U.S. PATENT DOCUMENTS

| | | | |
|---|---|---|---|
| 4,613,731 | 9/1986 | Godard | 379/410 |
| 4,742,510 | 5/1988 | Quatieri, Jr. et al. | 370/32.1 |
| 4,862,450 | 8/1989 | Guidoux | 370/32.1 |
| 4,935,919 | 6/1990 | Hiraguchi | 370/32.1 X |
| 4,947,425 | 8/1990 | Grizmala et al. | 370/32.1 X |
| 4,970,715 | 11/1990 | McMahan | 379/410 |
| 4,995,030 | 2/1991 | Helf | 370/32.1 |
| 5,042,026 | 8/1991 | Koike et al. | 370/32.1 |
| 5,084,865 | 1/1992 | Koike | 370/32.1 |
| 5,146,494 | 9/1992 | Harman | 379/411 |
| 5,189,664 | 2/1993 | Cheng | 379/410 X |
| 5,319,636 | 6/1994 | Long et al. | 379/410 X |
| 5,343,522 | 8/1994 | Yatrou et al. | 379/410 |
| 5,418,778 | 5/1995 | Cummiskey et al. | 370/291 |
| 5,425,098 | 6/1995 | Kamiya | 379/406 X |
| 5,473,600 | 12/1995 | Liu | 370/286 |
| 5,528,687 | 6/1996 | Tanaka et al. | 379/406 |

OTHER PUBLICATIONS

Bellcore Technical Committee Contribution, TR-30.3/95-11 "Listener Echo and Modem Performance", Nov. 13, 1995.

Primary Examiner—Krista M. Zele
Assistant Examiner—Devendra T. Kumar
Attorney, Agent, or Firm—Thomas, Kayden, Horstemeyer & Risley

[57] ABSTRACT

To improve the signal to noise ratio of the receiver of a transmitting modem, the transmitting modem is equipped with the ability to cancel the far listener echo. Advantageously, doing so allows higher data rates or reduced error rates. Cancellation of the far listener echo is achieved by coupling the signal containing the in-phase, quadrature (also known as X and Y, or real and imaginary) components of the modem transmit signal to a far echo canceller that is included in the modem in addition to the far echo canceller conventionally found in modems. However, the bulk delay employed by the additional far echo canceller is arranged to be a delay of two round trips between the transmitting modem and the receiving modem rather than the conventional single round trip delay of the conventional far echo canceller.

7 Claims, 2 Drawing Sheets

ECHO CANCELLATION FOR MODEMS

TECHNICAL FIELD

This invention relates generally to improving modem performance and, in particular, to improving modem performance by employing echo cancellation techniques.

BACKGROUND OF THE INVENTION

Far listener echo is the multiple echo of a signal originating at a transmitting modem. In particular, the signal from the transmitting modem a) reflects off the hybrid in the telephone central office (CO) serving the receiving modem, b) returns back to the hybrid in the CO serving the transmitting modem, c) reflects off the hybrid in the CO serving the transmitting modem back to the hybrid in the CO serving the receiving modem, and d) arrives back at the transmitting modem.

In the United States telephone network, each carrier inserts a 6 dB attenuation in the transmit path of each connection. Such an attenuation reduces the far listener echo.

SUMMARY OF THE INVENTION

However, in many countries, the telephone network does not include the attenuation necessary to effectively reduce far listener echo. In such situation, we have recognized that far listener echo can degrade the performance of a modem. In particular, far listener echo appears as a degraded signal to noise ratio (SNR) of the receiver of the transmitting modem.

In accordance with the principles of the invention, a transmitting modem is equipped with the ability to cancel the far listener echo. Advantageously, doing so results in an improved SNR for the receiver of the transmitting modem, thus allowing higher data rates or reduced error rates. Cancellation of the far listener echo is achieved by coupling the signal containing the in-phase, quadrature (also known as X and Y, or real and imaginary) components of the modem transmit signal to a far echo canceller that is included in the modem in addition to the far echo canceller conventionally found in modems. However, the bulk delay employed by the additional far echo canceller is arranged to be a delay of two round trips between the transmitting modem and the receiving modem rather than the conventional single round trip delay of the conventional far echo canceller.

In accordance with an aspect of the invention, because of inherent losses in telephone networks and the nature of echoes, even when there is no attenuation intentionally introduced by the telephone network the additional far echo canceller need not have the same cancellation ability as the original far echo canceller. Advantageously, the far listener echo canceller may be implemented at a lower cost than the original far echo canceller.

Additionally, to further save cost, the delay of two round trips may be implemented by coupling the output of the one round trip delay used for far echo cancellation to an additional delay of one round trip, in accordance with an aspect of the invention.

To achieve even greater cost savings, in accordance with an aspect of the invention, the additional far echo canceller is arranged to double the frequency offset angle of the phase locked loop of the original far echo canceller to provide twice the coordinate rotation as is used by the original far echo canceller. Doing so compensates for the doubling of the frequency offset introduced by the additional round trip that the signal has made through the network without requiting the additional far echo canceller to have its own phase locked loop.

DETAILED DESCRIPTION

Figure 1:
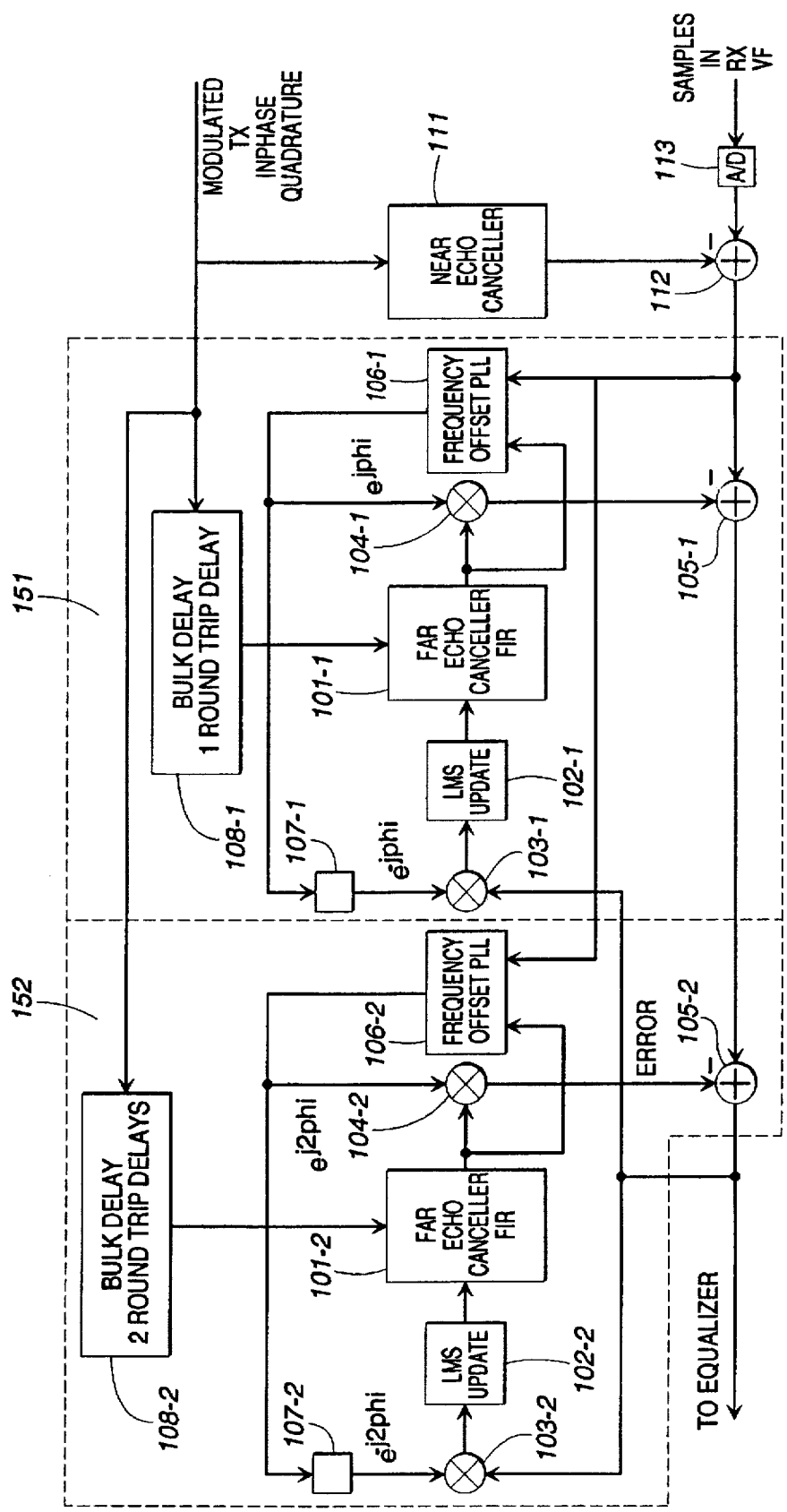
FIG. 1 shows an exemplary embodiment of a system for use by a transmitting modem in canceling far listener echo, in accordance with the principles of the invention.

FIG. 1 shows an exemplary embodiment of a system for use by a transmitting modem in canceling far listener echo, in accordance with the principles of the invention.

In the embodiment of the invention shown in FIG. 1, a) far echo canceller 151 is coupled to b) far listener echo canceller 152. The structure of far echo canceller 151 and far listener echo canceller 152 are identical. Each contains one of a) echo canceller finite impulse response (FIR) filter 101, b) least mean square (LMS) update 102, c) multipliers 103 and 104 for performing coordinate rotation, d) adder 105, e) frequency offset phase locked loop (PLL) 106, f) complex conjugate 107, and g) bulk delay 108. The components of far echo canceller 151 are designated by a suffix of "1" while the components of far listener echo canceller 152 are designated by a suffix of "2". Other than bulk delay 108-1 being configured for one-round-trip and bulk delay 108-2 being configured for a two-round-trip delay, in accordance with an aspect of the invention, the components of far echo canceller 151 and far listener echo canceller 152 are identical. Additionally, the components of far echo canceller 151 and far listener echo canceller 152 are interconnected in the conventional, well known manner for a far echo canceller, except that where far echo canceller 151 receives as an input to adder 105-1 the output of adder 112 which combines the digital version of the signal on the two wire telephone line connecting the modem to the central office after conversion from analog to digital format by A/D converter 113 with the output of near echo canceler 111 after cancellation of only the near echo by near echo canceller 111, far listener echo canceller 152 receives as an input to adder 105-2 the digital version of the signal on the two wire telephone line connecting the modem to the central office after cancellation of both the near echo and the far echo as output from adder 105-1 of far echo canceller 151. Because the majority of echo is canceled by far echo canceler 151, the far listener echo canceler 152 has an echo cancellation ability which is less than that of the far echo canceler 151.

Figure 2:
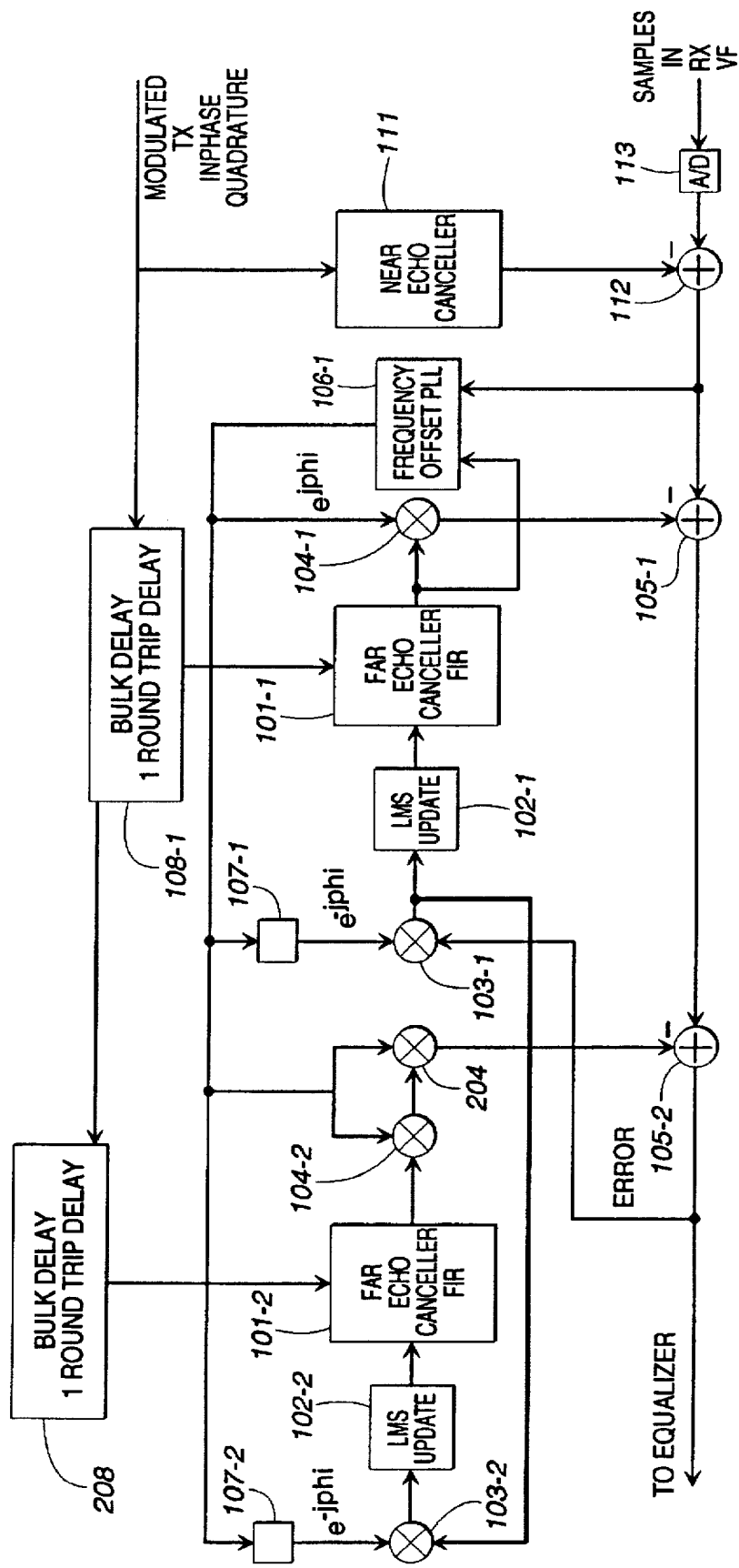
FIG. 2 shows another embodiment of the invention in which the cost of canceling the far listener echo is reduced by employing additional aspects of the invention.

FIG. 2 shows another embodiment of the invention in which the cost of canceling the far listener echo is reduced by employing additional aspects of the invention. Identically numbered components of FIG. 1 and FIG. 2 perform the identical function while similarly numbered components differing by series number, i.e., 100 or 200, perform similar functions.

In the manner shown, the output of bulk delay 108-1 is supplied to bulk delay 208. Bulk delay 208 has a delay of one round trip, i.e., a delay identical to that of bulk delay 108. By so concatenating bulk delays 108 and 208, in accordance with an aspect of the invention, the output of bulk delay is delayed by two round trips while, advantageously, only enough memory to implement an additional round trip is required. The output of bulk delay 208 is supplied to echo canceller finite impulse response (FIR) filter 101-2 as was the identical output of bulk delay 108-2.

To avoid the cost of including two phase locked loops, in the embodiment of the invention shown in FIG. 2, the output of frequency offset phase locked loop 106-1 is applied twice to the signal supplied as an output by far listener echo canceller finite impulse response filter 101-2, first by multiplier 104-2 and then again by multiplier 204. Each of multipliers 104-2 and 204 effect a coordinate rotation of their respective inputs by same angle as is effected by 104-1, since they each have as an input the output of frequency offset phase locked loop 106-1. Consequently, the series connection of multipliers 104-2 and 204 results in the output of multiplier 204 being rotated by twice the amount of rotation as the output of multiplier 104-1.

Additionally, the error signal supplied as input to multiplier 103-1 must be rotated twice in order to omit a second phase locked loop. Therefore, the one time rotated error signal developed as an output by multiplier 103-1 is supplied as input to multiplier 103-2. Thus, the output of multiplier 103-2 is twice rotated with respect to the original error signal supplied as an output from adder 105-2. Note that, as is well known in the art, the error signal is rotated in the opposite direction from the output of echo canceller finite impulse response filters 101.

It is noted that the invention may be implemented in analog or digital circuitry, or in a combination thereof. It is also noted that the invention may be implemented on a digital signal processor.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A modem comprising:

means for supplying a transmitted signal;

a far echo canceler; and an additional far echo canceler, said additional far echo canceler containing means for substantially canceling the far listener echo of said transmitted signal, said means including a delay of two round trips between said modem and a modem to which said transmitted signal is being supplied.

2. The invention as defined in claim 1, wherein the echo cancellation ability of said additional far echo canceler is less than the echo cancellation ability of said far echo canceler.

3. The invention as defined in claim 1, wherein said far echo canceler contains a phase locked loop for providing the coordinate rotation, and wherein said additional far echo canceler includes:

doubling means for doubling the frequency offset angle of said phase locked loop; and compensating means for compensating for the two-fold frequency offset of said far listener echo.

4. The invention as defined in claim 3, wherein said doubling means and said compensating means perform the function of said phase locked loop in said additional far echo canceler.

5. A modem having means for transmitting a signal, comprising:

a far echo canceler for canceling a far echo of a transmitted signal; and a far listener echo canceler for canceling a far listener echo of said transmitted signal wherein said far echo canceler and said far listener echo canceler have an identical structure, except that a bulk delay of said far echo canceler is set to equal the round-trip delay between said modem and a remote modem to which said modem is transmitting said signal and that a bulk delay of said far listener echo canceler is set to equal twice the round-trip delay between said modem and said remote modem.

6. The invention as defined in claim 5, wherein said far echo canceler contains a phase locked loop for providing the coordinate rotation, and wherein said far listener echo canceler includes:

means for doubling the frequency offset angle of said phase locked loop; and means for compensating for the two-fold frequency offset of said far listener echo.

7. A modem having means for transmitting a signal, comprising:

a far echo canceler for canceling a far echo of a transmitted signal; and a far listener echo canceler for canceling a far listener echo of said transmitted signal, said far echo canceler and said far listener echo canceler having an identical structure, except that a bulk delay of said far echo canceler is set to equal a round-trip delay between said modem and a remote modem to which said modem is transmitting said signal and said bulk delay of said far listener echo canceler is also set to equal said round-trip delay between said modem and said remote modem, said bulk delay of said far listener echo canceler being arranged to receive as an input the delayed output of said far echo canceler bulk delay.

* * * * *